United States Patent [19]
Goff et al.

[11] Patent Number: 5,738,256
[45] Date of Patent: Apr. 14, 1998

[54] ADAPTABLE AIMING SUPPORT

[76] Inventors: Jerry Alan Goff; Sherwood Lunsford Goff, both of 21595 Yankee Town Rd., Saucier, Miss. 39574

[21] Appl. No.: 674,385

[22] Filed: Jul. 2, 1996

[51] Int. Cl.⁶ .................................................. A45F 5/00
[52] U.S. Cl. ..................... 224/185; 224/191; 224/197; 224/908; 224/909; 224/913
[58] Field of Search ........................... 224/185, 191, 224/197, 250, 660, 684, 271, 272, 908, 909, 913; 396/420, 422, 425, 428; 248/351, 354.1; 128/878; 602/12, 16, 20, 21

[56] References Cited

U.S. PATENT DOCUMENTS

| | | |
|---|---|---|
| 46,365 | 2/1865 | Kinman . |
| 74,119 | 7/1868 | Muller . |
| D. 134,542 | 12/1942 | Wax .................................. 224/684 |
| 167,169 | 8/1875 | Hare . |
| 281,338 | 7/1883 | Butler . |
| 454,300 | 6/1891 | Sproul . |
| 664,979 | 1/1901 | Taylor . |
| 759,593 | 5/1904 | Cover . |
| 817,207 | 4/1906 | Wheeler ............................ 224/185 |
| 1,018,771 | 2/1912 | Neuburger ......................... 224/909 |
| 1,993,485 | 3/1935 | Paul .................................. 224/908 |
| 2,552,205 | 5/1951 | Moss ................................. 224/272 |
| 2,711,122 | 6/1955 | Klumpp ............................. 224/185 |
| 3,191,826 | 6/1965 | Adams . |
| 3,200,528 | 8/1965 | Christensen . |
| 3,390,477 | 7/1968 | Galbraith . |
| 3,784,068 | 1/1974 | Pistilli ............................... 224/909 |
| 3,882,914 | 5/1975 | Strutz ................................ 224/619 |
| 4,150,464 | 4/1979 | Tracy . |
| 4,394,948 | 7/1983 | Graber ............................... 224/924 |
| 5,332,136 | 7/1994 | Rudolph ............................ 224/191 |
| 5,351,867 | 10/1994 | Vest . |
| 5,385,536 | 1/1995 | Burkhead et al. ................. 602/20 |
| 5,598,963 | 2/1997 | Buswell ............................ 224/908 |

FOREIGN PATENT DOCUMENTS

| | | | |
|---|---|---|---|
| 339.104 | 11/1994 | France .................................. 42/94 |
| 37527 | 6/1909 | Germany .............................. 42/94 |
| 244253 | 5/1911 | Germany .............................. 42/94 |
| 478628 | 6/1929 | Germany .............................. 42/94 |

OTHER PUBLICATIONS

Pete Dickey, "Shooting Sticks Help", American Rifleman, Jun. 1982, vol. 130, No. 6.

Primary Examiner—Henry J. Recla
Assistant Examiner—Gregory M. Vidovich
Attorney, Agent, or Firm—Seidel, Gonda, Lavorgna & Monaco, PC

[57] ABSTRACT

An adaptable aiming support device includes a waist belt for securing the device to a person's waist. A rigid base plate is affixed to the waist belt and includes a bracket mounted thereon. An extendible and retractable support rod is mounted to and pivotable upon a pivot pin disposed within the bracket. The support rod extends from the bracket and includes a primary tube and a secondary tube in adjustable telescoping engagement with the primary tube. The distal end of the support rod is adapted to receive one of a set of interchangeable endpieces for supporting a device to be aimed (e.g., a gun, a camera, a binocular). A quick release pin mechanism is provided at the distal end to attach/remove a given endpiece (of the set of interchangeable endpieces) thereto/therefrom quickly and easily.

15 Claims, 5 Drawing Sheets

ADAPTABLE AIMING SUPPORT

FIELD OF THE INVENTION

The present invention is generally related to the field of aiming support devices, such as gun rests and camera rests. In particular, the present invention relates to an aiming support that is pivotably attached to a waist belt, adjustable in its length, and adapted to accept a variety of interchangeable endpieces for supporting such devices as a firearm, a camera, a binocular, or other aimed device.

BACKGROUND OF THE INVENTION

Aiming supports, often called "rests," offer a firm and steady support structure for firearms, cameras, monocular and binocular magnifying lenses, and other devices which must be aimed at and held motionless on a target to be fully effective. There are a wide variety of fixed and portable rests for guns and cameras, including monopods, bipods, and tripods. Each has its own advantages. In general, monopods such as shooting sticks are lighter and simpler, but less steady, than bipods and tripods. In supports where the height is adjustable, monopods can usually be adjusted more rapidly than bipods and tripods.

Hunters and other nature enthusiasts (e.g., wildlife photographers, bird-watchers, etc.) value aiming supports that are light in weight, compact, readily portable, and that allow for quick assembly and easy height adjustment. They also value aiming supports that permit extended use without causing their hands and arms to become fatigued.

SUMMARY OF THE INVENTION

The present invention contemplates an adaptable aiming support device that uniquely meets the requirements of hunters and other nature enthusiasts. The aiming support device includes a waist belt for securing the device to a person's waist. A rigid base plate affixed to the belt has a bracket mounted thereon which includes side walls that support a pivot pin. An extendable/retractable support rod is attached to the pivot pin. The support rod includes a hollow primary tube and a secondary tube in telescoping engagement with the primary tube. The primary tube is mounted to and pivotable upon the pivot pin. A lever-actuated cam locking means is provided for retaining the secondary tube in a length-adjusted position within the primary tube. The distal end of the secondary tube is adapted to receive one of a set of interchangeable endpieces for supporting a particular type of device to be aimed (e.g., a gun, a camera, a binocular). A quick release pin is provided at the distal end to attach/remove a given endpiece thereto/therefrom quickly and easily.

Further features and advantages of the present invention will become apparent to those skilled in the art upon reviewing and comprehending the embodiment described below and illustrated in the accompanying drawings.

BRIEF DESCRIPTION OF THE DRAWINGS

For the purpose of illustrating the invention, the drawings show a form which is presently preferred. However, the invention is not intended to be limited, nor is it limited, to the precise arrangement and instrumentalities shown.

DETAILED DESCRIPTION OF THE DRAWINGS

Figure 1:
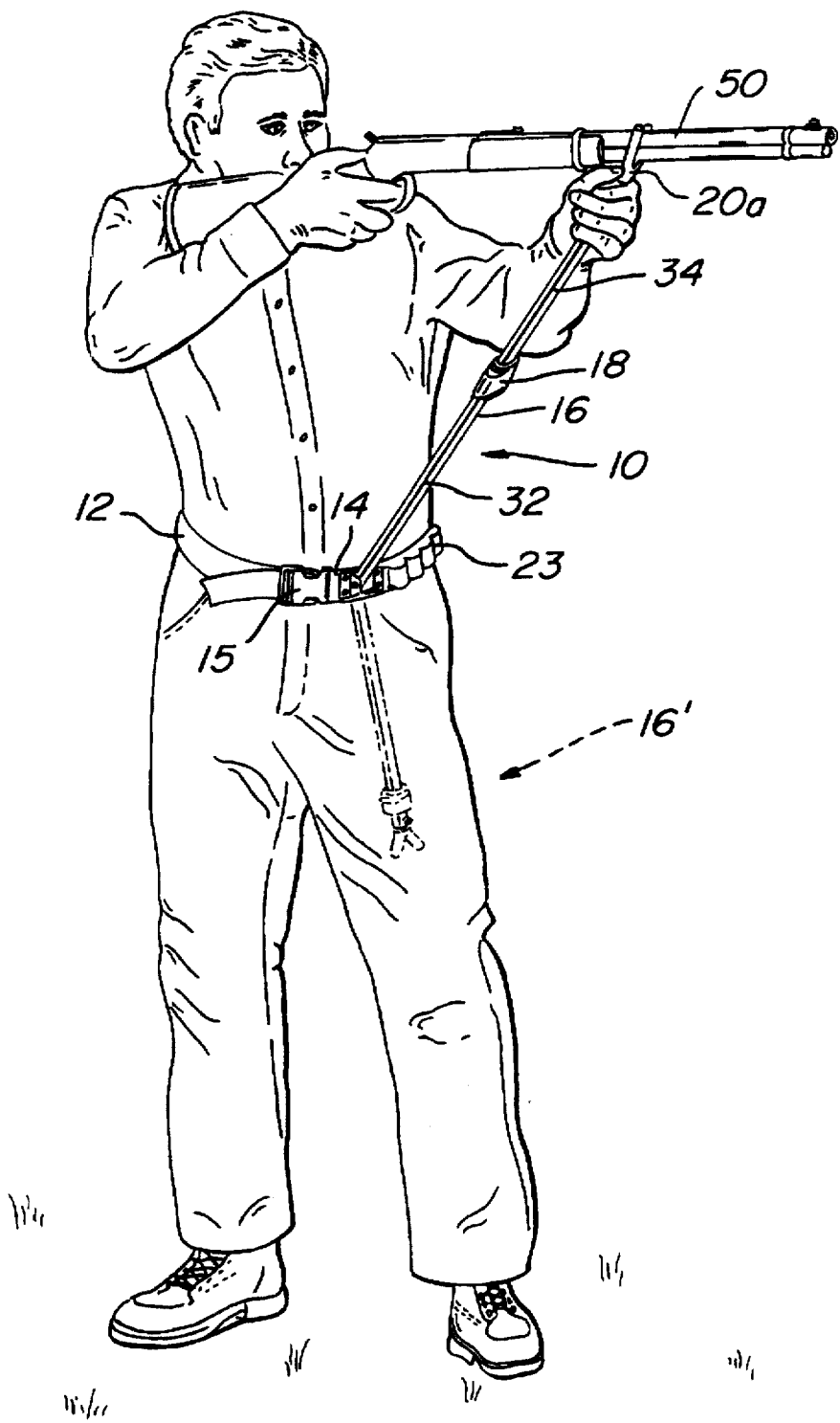
FIG. 1 is a perspective view of the aiming support as contemplated by the invention in use as a gun rest.
Figure 2:
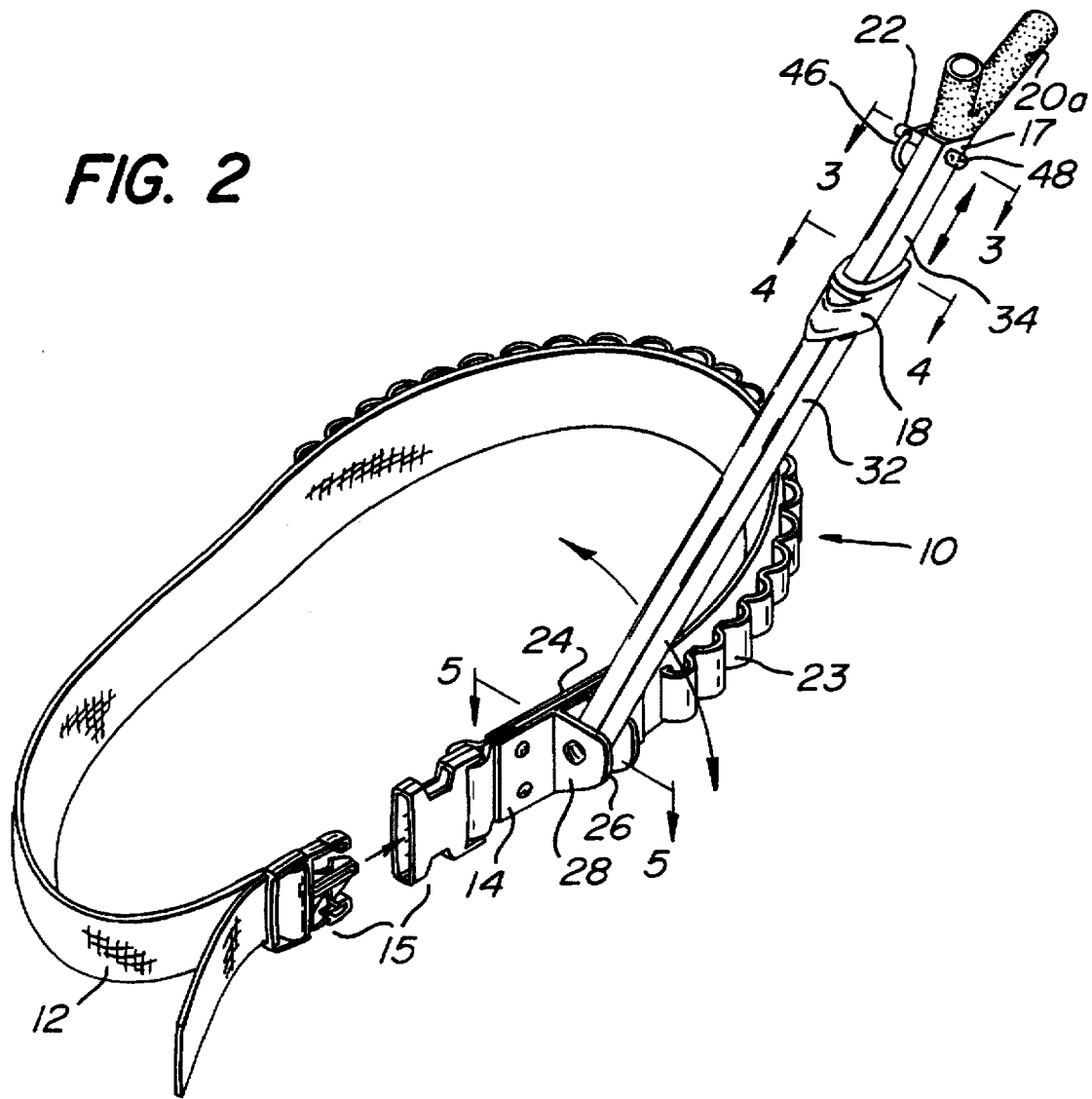
FIG. 2 is an enlarged perspective view of the aiming support alone, adapted for use as a gun rest.

In the drawings, where like numerals indicate like elements, there is shown an adaptable aiming support device which is generally designated by the numeral 10. FIGS. 1 and 2 show a preferred embodiment of the aiming support device 10 configured as a gun rest. The gun rest includes a waist belt 12 for securing the device around the shooter's waist. A rigid base plate 14 is affixed to the belt 12 near the buckle 15. An extendable/retractable support rod 16 incorporating a lever-actuated cam locking clamp 18 is pivotably attached to the base plate 14 in a manner described in greater detail hereafter. An endpiece 20a shaped as a two-pronged channel or "Y"-shaped seat to support a gun barrel or forestock is attached to the distal end 17 of the support rod 16 by a quick release pin mechanism 22 in a manner also described in greater detail hereafter.

Since the support rod 16 is extendable and retractable in length and pivotably mounted to the base plate 14, it may be fully-retracted and allowed to dangle out of the way along one's leg when walking or riding, as shown by the phantom image 16' in FIG. 1. It should be apparent that the retracted support rod may be taped to one's pant leg or otherwise secured against one's thigh to prevent noise while stalking or calling game.

The belt 12 may be made of any flexible material, such as webbed nylon, natural or synthetic leather, or the like. The belt buckle 15 is preferably of the easy fastening type disclosed in U.S. Pat. No. 4,150,464. The belt 12 may also have cartridge loops 23 disposed thereon for holding ammunition.

The base plate 14 is preferably formed of metal, plastic, or other rigid material. As shown in FIG. 2, the base plate 14 may be attached to the belt 12 with a support plate 24, desirably shaped to match the dimensions of the base plate, provided on the inner surface of the belt directly opposite the base plate. The support plate 24 is secured to the base plate 14 by rivets or any other conventional fasteners extending through the belt 12. By this arrangement, the belt 12 is held firmly between the two plates.

Figure 5:
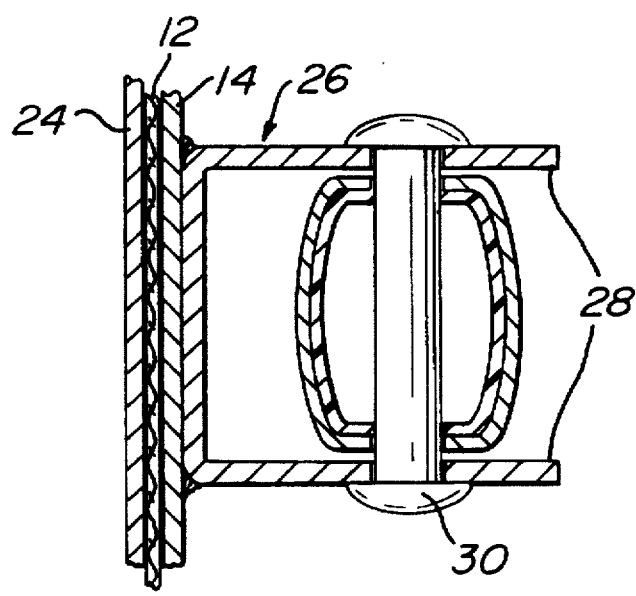
FIG. 5 is a sectional top view of the support member and bracket of the invention taken along line 5—5 of FIG. 2 exposing the pivot pin.

The base plate 14 has a bracket 26 mounted thereon, desirably formed of the same or similar rigid material as the base plate. As best viewed in FIG. 5, opposing side walls 28 of the bracket 26 extend outwardly, substantially perpendicular to the base plate 14, and support a pivot pin 30 disposed therebetween. The pivot pin 30 passes through the extendable/retractable support rod 16, such that the rod is pivotally retained at one end between the side walls 28. As shown in FIG. 5, the pivot pin 30 extends through aligned holes formed in the end of the support rod 16 and through corresponding aligned holes formed in the side walls 28. If the side walls 28 are spaced apart significantly wider than the width of the support rod 16, a rotating bead or beads (not shown) may be placed on the pivot pin 30 beside the rod to take up the extra space.

The support rod 16 is desirably comprised of a hollow primary tube 32 and a secondary tube 34 in telescoping engagement within the primary tube. The tubes are preferably of a generally rectangular cross section with rounded corners, slightly convex longer sides, and flat shorter sides. If another shape is used, it should have at least one flat side for locking the rods into place against each other with a cam locking clamp as described hereafter.

Figure 4:
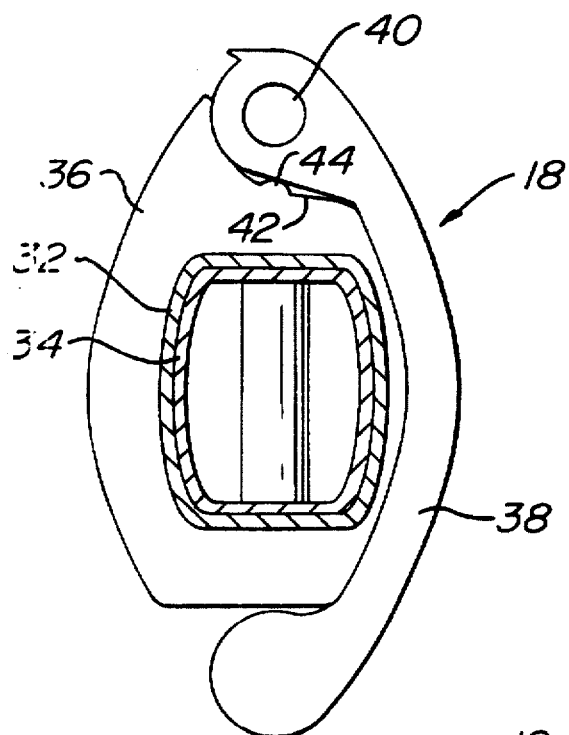
FIG. 4 is a sectional top view of the support member of the invention taken along line 4—4 of FIG. 2 exposing the lever-actuated cam locking clamp.

The lever-actuated cam locking clamp 18 may be any of several types now commonly used with camera tripods. They share the common characteristic of a finger tab lever mounted on a pin, which, when depressed against the primary tube, uses a camming action to lock the secondary tube in place. The embodiment shown in FIG. 4 has a resilient plastic body 36 fitted onto and about the distal end 17 of the primary tube 32, and extending beyond the end of the primary tube. A finger tab lever 38 is mounted on a pin 40 attached to the body over a cam slot 42 with a protruding ridge 44. The resilient plastic body 36 extends beyond the primary tube 32 and around the secondary tube 34. When the finger tab lever 38 is depressed against the primary tube 32 as shown in FIG. 4, the lever pulls the portion of the resilient body 36 opposite the pin 40 tightly around and against the secondary tube 34, locking it in place. Unlocking the lever 38 (pulling the lever outward) releases the secondary tube 34 from the grip of the resilient body 36 and enables relative longitudinal movement of the secondary tube within substantially the entire length of the primary tube 32. The tubes may be held fixed in any intermediate position by locking down the lever 38.

Another similar type of lever-actuated cam locking clamp uses a rigid body rather than a resilient body, and the lever is mounted to a pin which is exposed over the secondary tube. The lever has an eccentric shape around the pin, such that when the finger tab lever is depressed toward the primary tube, the wide part of the eccentric creates a camming action to jam the secondary tube against the opposite wall of the primary tube. There may be other varieties of such locking clamps that share the common characteristic of a pin-mounted finger tab lever which, when depressed against the primary tube, uses a camming action to lock the secondary tube in place.

It should be appreciated that the clamping functions performed by the preferred cam locking clamp could also be performed by a collet clamp arrangement or by a detent arrangement or other arrangement. In such alternative arrangements, the particular cross-sectional profiles of the tubes may not be particularly important (i.e., tubes having annular cross-sectional profiles could prove to be entirely suitable for clamping). However, the lever-actuated cam locking clamp is preferred because it can be released and set quickly if the support has to be brought into use quickly.

Figure 3:
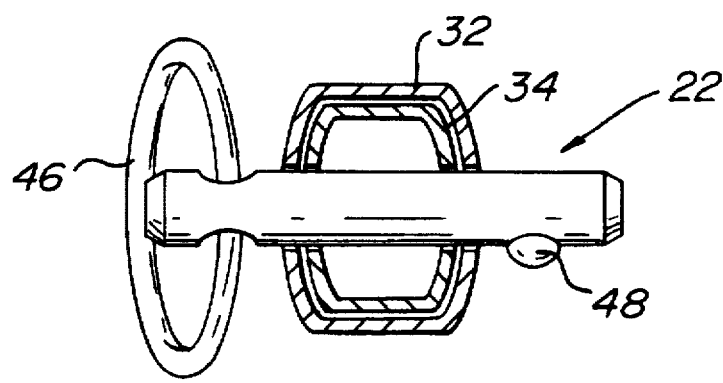
FIG. 3 is a sectional top view of the support member of the invention taken along line 3—3 of FIG. 2 exposing the quick release pin.

The distal end 17 of the support rod 16 (i.e., the distal end of the secondary tube 34) is preferably open-ended to accommodate insertion of one of a set of interchangeable endpieces. In the case of the gun rest, an endpiece 20a shaped as a two-pronged channel or "Y"-shaped seat to support a gun barrel or forestock is attached. Desirably, the endpiece 20a is formed from a rubberized material or similar material that will not scratch the gun barrel or forestock. As best shown in FIG. 2, the gun barrel seat endpiece 20a includes an extension piece (not shown) adapted to be inserted into the open distal end 17 of the secondary tube 34. A hole is formed through the extension piece in alignment with holes formed in the distal end 17 of the secondary tube 34 to define a passageway extending completely through the distal end when the extension piece is inserted. The removable quick release pin 22, shown in FIG. 3, is inserted through the passageway formed by the aligned holes to retain the gun barrel seat 20a in place at the distal end 17. This arrangement is best illustrated in FIG. 2. Preferably, the quick release pin 22 is an elongated cylinder having a ring 46 sized to allow a person's finger to pass therethrough at one end, and a ball-and-spring detent 48 at the opposite end. The detent 48 releases the quick release pin 22 from the passageway only when a pulling force is applied to the ring 46, and prevents the pin from accidentally slipping out of the passageway and allowing the endpiece to become dislodged.

To use the aiming support device 10 as a gun rest, reference being made particularly to FIG. 1, the shooter fastens the belt 12 comfortably about his/her waist preferably with the rigid base plate 14 positioned slightly to one side depending upon right or left-handed shooting. The gun seat endpiece 20a is inserted into the open distal end 17 of the secondary tube 34 and locked into place by inserting the quick release pin 22 completely through the aligned holes in the distal end. The support rod 16 is then adjusted in length to support a rifle barrel 50 at the desired elevation for the expected shooting position (i.e., offhand, kneeling). This length adjustment is accomplished by unlocking the lever-actuated cam locking clamp 18, extending the secondary tube 34 with respect to the primary tube 32, and locking down the clamp (all of which may be accomplished using one hand). The rifle is then positioned as shown in FIG. 1 with the barrel 50 seated in the "Y"-shaped seat 20a and the butt of the stock against the shooter's shoulder. The shooter can then grasp the support rod 16 beneath the barrel 50 and move the barrel over the target. Fine adjustment for elevation may be accomplished by sliding the barrel or forestock in the seat 20a. It should be apparent that the gun rest permits transfer of a significant portion of the gun weight from the shooter's hand and arm (used to support the rifle barrel) to his/her body, greatly reducing fatigue, and facilitates attaining and maintaining directional control of the rifle with minimal effort. It should also be apparent that the gun rest can be used to support a pistol.

Figure 6:
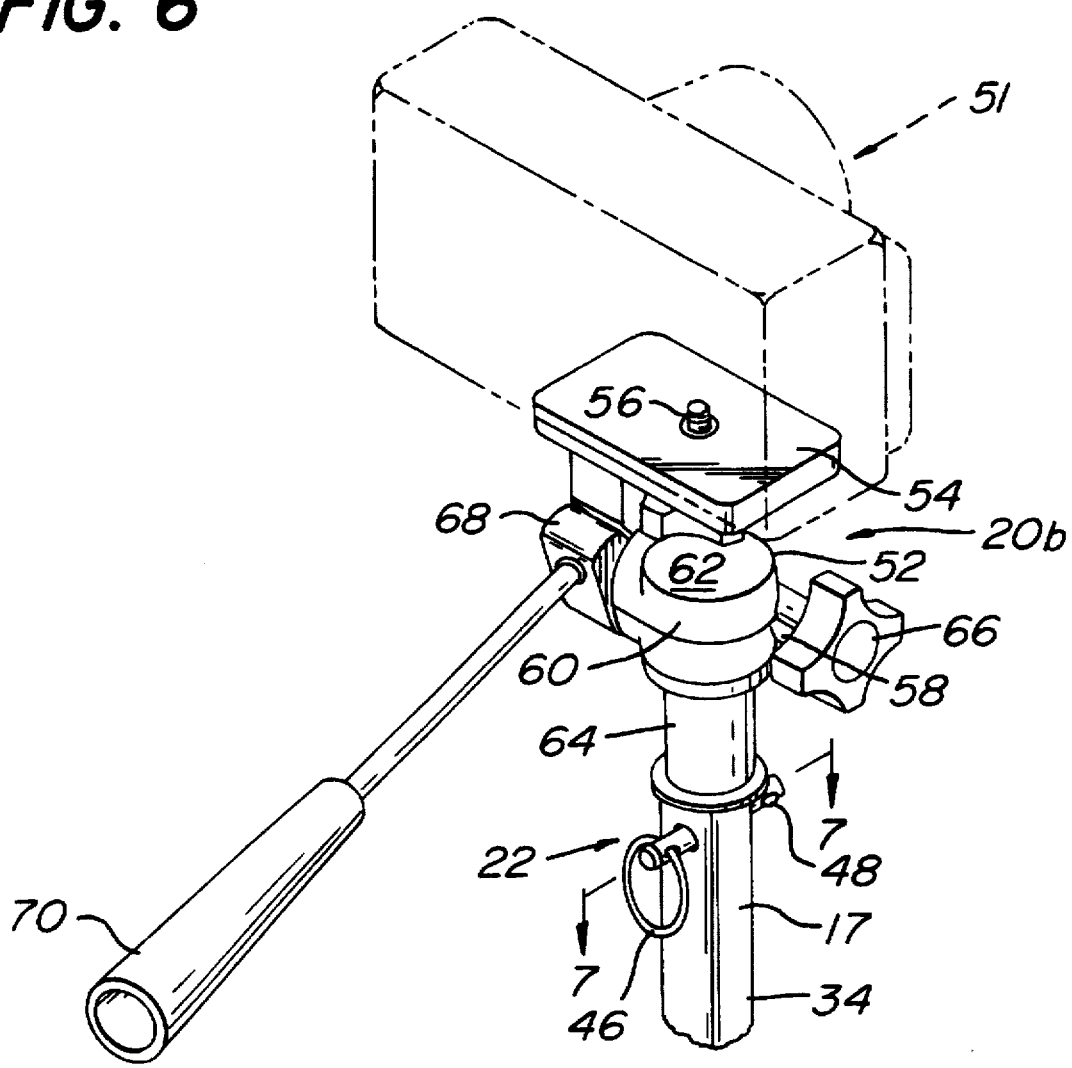
FIG. 6 is a partial perspective view of the distal end of the secondary tube of an alternative embodiment of the invention adapted to receive a camera seat attachment for supporting a camera (shown in phantom).
Figure 7:
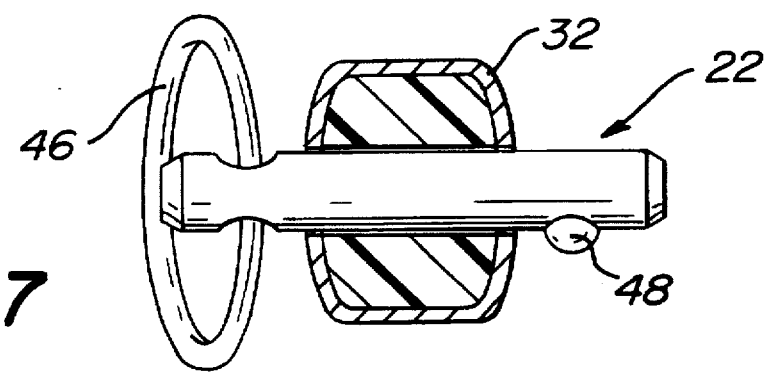
FIG. 7 is a sectional top view of the support member of an alternative embodiment of the invention taken along line 7—7 of FIG. 6 exposing the quick release pin.

The invention lends itself to uses other than as a gun rest. FIG. 6 shows the aiming support device 10 fired with an endpiece 20b configured for use as a camera seat attachment for supporting a still camera 51 (shown in phantom), a video camera, or the like. The seat attachment 20b includes an extension piece (not shown) adapted to be inserted into the open distal end 17 of the secondary tube 34. As with the extension piece of the gun barrel seat 20a, a hole formed through the extension piece of the camera seat attachment 20b together with aligned holes formed in the distal end 17 of the secondary tube 34 define a passageway extending completely through the distal end when the extension piece is inserted. As shown in FIGS. 6 and 7 (and as demonstrated earlier with respect to the gun rest configuration), the removable quick release pin 22 is inserted in the passageway to retain the camera seat attachment 20b in place at the distal end 17.

The camera seat attachment 20b further includes a panoramic head 52. The head may be any of several types now commonly used with camera tripods. They share the common features of a camera platform, a camera screw for securing the camera to the platform, a side-tilt lock used for adjustably tilting the camera, and a horizontal motion lock used for adjustably swiveling the camera.

The embodiment shown in FIG. 6 incorporates these features. A camera platform 54 is provided having a camera screw 56 extending upwardly therethrough for engaging a screw hole in the camera 51 (shown in phantom). A horizontal motion lock 58 disposed beneath the platform 54 includes a screw in threaded engagement with a collar 60 which encircles a cylinder 62 extending vertically from a pedestal 64 affixed atop the extension piece. A knob 66 is provided at the non-threaded end of the screw to facilitate tightening and loosening of the screw. Tightening the knob 66, in turn, tightens the collar 60 about the cylinder 62 thereby restricting the ability of the panoramic head 52 to rotate horizontally, or swivel, about the cylinder. It should be apparent that loosening the knob 66, in turn, loosens the collar 60 and allows the panoramic head 52 to swivel about the cylinder. A side-tilt lock 68, disposed adjacent a side of the collar 60 and connected thereto by means of a horizontal pin (not shown), connects the collar to the camera platform 54. The side-tilt lock 68 rotates axially about one end of the horizontal pin. An elongated handle 70 having a threaded end engages a screw hole extending into the side-tilt lock 68. Tightening the handle 70, in turn, causes the side-tilt lock 68 to tighten about the horizontal pin thereby restricting the ability of the panoramic head 52 to pivot axially. It should be apparent that loosening the handle 70, in turn, loosens the grip of the side-tilt lock 68 on the horizontal pin permitting the camera platform 54 and the side-tilt lock to pivot axially about the horizontal pin.

Figure 8:
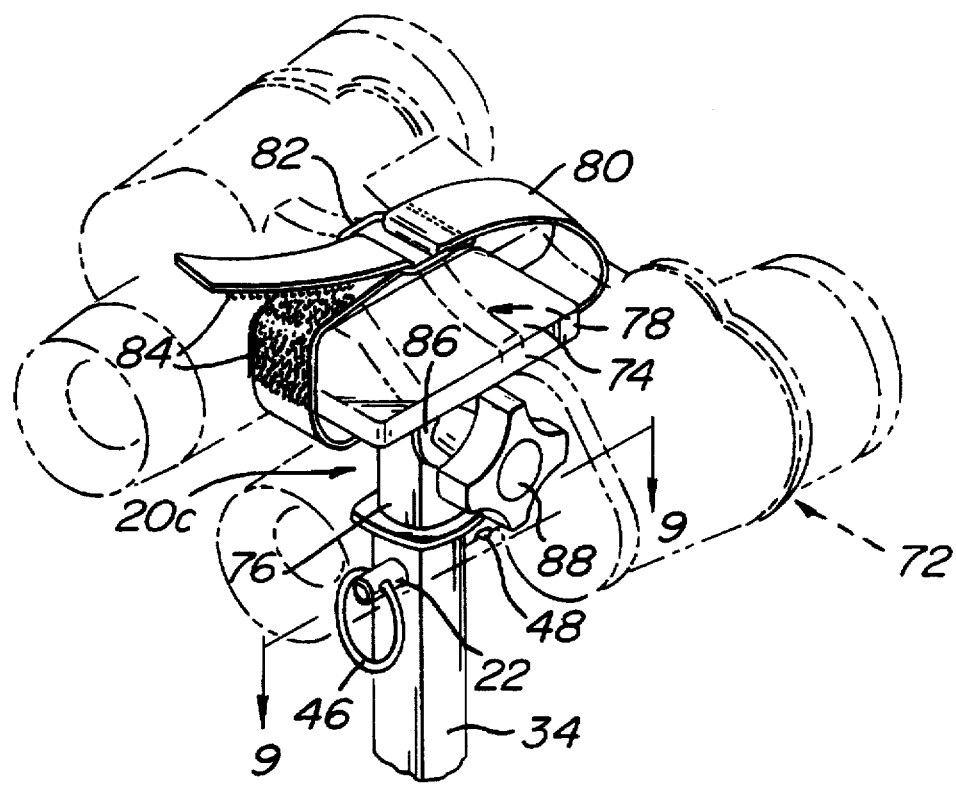
FIG. 8 is a partial perspective view of the distal end of the secondary tube of an alternative embodiment of the invention adapted to receive a seat for supporting a binocular (shown in phantom).
Figure 9:
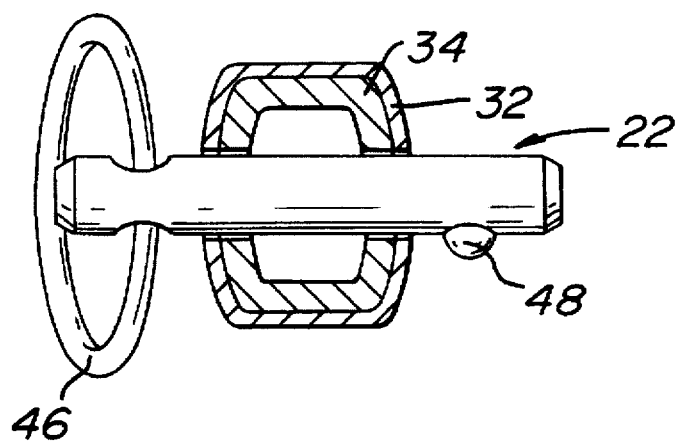
FIG. 9 is a sectional top view of the support member of an alternative embodiment of the invention taken along line 9—9 of FIG. 8 exposing the quick release pin.

As shown in FIG. 8, the aiming support device 10 is fitted with an endpiece 20c configured for use as a binocular seat for supporting a binocular 72 (shown in phantom). The binocular seat 20c includes an extension piece (not shown) adapted to be inserted into the open distal end 17 of the secondary tube 34. As with both the extension piece of the gun barrel seat 20a and the extension piece of the camera seat attachment 20b, a hole formed through the extension piece of the binocular seat 20c together with aligned holes formed in the distal end 17 of the secondary tube 34 define a passageway extending completely through the distal end when the extension piece is inserted. As shown in FIGS. 8 and 9 (and as demonstrated earlier with respect to both the gun rest configuration and the camera seat configuration), the removable quick release pin 22 is inserted in the passageway to retain the binocular seat 20c in place at the distal end 17.

As shown in FIG. 8, the binocular seat 20c further includes a binocular platform 74, disposed atop a pedestal 76 of the extension piece, for supporting the bridge 78 of the binocular 72. An adjustable strap 80 affixed to the binocular platform 74 is provided for securing the binocular 72 to the platform. One end of the strap 80 includes a buckle 82 through which the other end of the strap may be passed. The other end of the strap 80 preferably has hook-and-loop fastener material 84 disposed on both sides thereof to fasten the strap about the bridge 78 of the binocular 72. It should be apparent that the strap may employ fasteners other than hook-and-loop fasteners (e.g., snaps, a buckle hole and buckle arrangement, etc.). Indeed, fastening means other than the strap (e.g., a bracket) may be provided to hold the bridge of the binocular in place on the binocular platform.

Desirably, the binocular platform 74 is pivotable about a binocular seat pivot pin (not shown). The pin enables the binocular platform 74 (and the binocular 72 mounted thereon) to be tilted up or down. A tilt lock 86 is disposed adjacent a side of the pedestal 76 that supports the binocular platform 74. The tilting action is controlled by manipulating a knob 88 attached to an end of a threaded screw which engages a screw hole extending into the tilt lock 86. When loosened, the knob 88 allows the binocular platform 74 to pivot axially about the pin. When tightened, the knob 88 locks the binocular platform 74 in adjusted position. By this arrangement, the extension piece of the binocular seat 20c may be collapsed against the body of the binocular 72 when the seat is removed from the distal end 17 of the support rod 16. This permits one to suspend the binocular about one's neck in the conventional manner, and with the binocular seat remaining attached thereto and ready for use, without having the extension piece poking one's chest.

To use the aiming support device 10 of the invention as a camera rest or as a binocular rest, one fastens the belt 12 comfortably about one's waist preferably with the rigid base plate 14 positioned centrally. In use of the camera rest, the camera 51 is screwed onto the camera platform 54 of the camera seat attachment 20b. In use of the binocular rest, the binocular 72 is strapped to the binocular platform 74 of the binocular seat 20c. The camera seat attachment 20b or the binocular seat 20c may then be inserted into the open distal end 17 of the secondary tube 34 and locked into place by inserting the quick release pin 22 completely through the aligned holes in the distal end 17. The support rod 16 is adjusted in length to place the camera 51 or the binocular 72 at eye level for the expected viewing position (i.e., standing, kneeling, sitting). This length adjustment is accomplished in the manner described earlier in connection with the gun rest configuration. The camera 51 or the binocular 72 may be conveniently maintained in proper viewing position merely by holding the support rod 16 substantially vertical. In use of the camera rest, fine adjustments to the elevation or to the horizontal disposition of the camera may be effected via the side-tilt lock 68 or the horizontal motion lock 58, respectively. In use of the binocular rest, fine adjustments for elevation may be accomplished via the tilt-lock 86.

When adapted for use as a camera rest or as a binocular rest, the aiming support device 10 of the invention permits transfer of the weight of the camera or binocular away from one's hands and arms. This greatly reduces fatigue and enables one to aim and use the camera or binocular for extended periods of time.

While the invention has been shown and described with reference to preferred embodiments, it should be appreciated that modifications, variations, and other changes may be made without departing from the spirit and scope of the invention. Accordingly, reference should be made to the appended claims, rather than to the foregoing specification, as indicating the scope of the invention.

What is claimed is:

1. An aiming support comprising:

a waist belt;

a base plate affixed to the belt;

a bracket mounted on the base plate and including opposing side walls extending outwardly substantially perpendicularly from the base plate;

an extendable/retractable support rod including a primary tube, a secondary tube in telescoping engagement with the primary tube, and means for retaining the secondary tube in an adjusted position with the primary tube, the secondary tube having a distal end adapted to receive one of a set of interchangeable endpieces for supporting a device to be aimed;

a quick release pin for retaining the one of a set of interchangeable endpieces in the distal end of the secondary tube; and means for pivotally mounting the primary tube between the side walls of the bracket.

2. An aiming support as in claim 1, wherein the tube retaining means is a lever-actuated cam locking clamp.

3. An aiming support as in claim 1, wherein the pivotal mounting means is a pivot pin extending through aligned holes formed in an end of the primary tube and through corresponding aligned holes formed in the side walls of the bracket.

4. An aiming support as in claim 1, wherein the quick release pin for retaining the one of a set of interchangeable endpieces extends through aligned holes formed in the distal end and through a corresponding hole formed in an extension piece of the one of a set of endpieces.

5. An aiming support as in claim 4, wherein the one of the set of endpieces is a gun barrel seat for supporting a barrel of a gun.

6. An aiming support as in claim 4, wherein the one of the set of endpieces is a binocular seat for supporting a binocular.

7. An aiming support as in claim 6, further comprising means for adjustably tilting the binocular seat and retaining the binocular seat in adjusted position.

8. An aiming support as in claim 6, wherein the binocular seat includes a binocular platform having means for securing the binocular to the binocular platform.

9. An aiming support as in claim 8, wherein the means for securing the binocular to the binocular platform is an adjustable strap.

10. An aiming support as in claim 4, wherein the one of the set of endpieces is a camera seat attachment for supporting a camera.

11. An aiming support as in claim 10, wherein the camera seat attachment includes a camera platform and means for securing the camera thereto.

12. An aiming support as in claim 11, further comprising means for adjustably tilting and swiveling the camera platform and retaining the platform in an adjusted position.

13. An aiming support as in claim 1, further comprising a support plate attached to the base plate through the belt which is held therebetween.

14. An aiming support as in claim 1, further comprising means for fastening the belt about a person's waist.

15. An aiming support as in claim 1, wherein the belt includes one or more cartridge loops.

* * * * *